Jan. 7, 1941.  F. J. WOOD  2,227,688
WELDING FIXTURE
Filed Dec. 19, 1938  4 Sheets-Sheet 2

Inventor
Frank J. Wood
Clarence F. Poole
Attorney

Jan. 7, 1941.　　　　F. J. WOOD　　　　2,227,688
WELDING FIXTURE
Filed Dec. 19, 1938　　　4 Sheets-Sheet 4

Inventor
Frank J. Wood
Clarence F. Poole
Attorney

Patented Jan. 7, 1941

2,227,688

UNITED STATES PATENT OFFICE 2,227,688

WELDING FIXTURE

Frank J. Wood, Riverside, Ill., assignor to Goodman Manufacturing Company, Chicago, Ill., a corporation of Illinois Application December 19, 1938, Serial No. 246,594

8 Claims. (Cl. 113—59)

This invention relates to improvements in welding fixtures for supporting a heavy casting or frame for welding, and has as its principal object to provide such a fixture, upon which the material may be attached without the use of a crane, and which will permit any side of the frame or casting to be welded in the direction of gravity without removing the frame or casting from the fixture.

In order to obtain the best results in welding, it is desirable to weld in a direction so the molten metal will flow into the joint by gravity. In doing this, especially with heavy castings or frames, it is usually necessary to lift the frame by jacks or a crane and set the frame in the desired position on blocks, and when the frame is welded on one side, it must frequently be turned over to permit welding of the other side, by the same process of jacks, or by a crane. Such an operation is very laborious and the proper setting of the piece of material usually takes more time than the actual welding operation. While fixtures have been provided for supporting a piece of material for welding, these fixtures have been so designed that the piece must be removed to weld the bottom. These fixtures also require a crane to lift the metal onto the fixture, which takes time and ties up the crane during the welding operation.

In carrying out my invention I overcome these difficulties in a novel and simple manner by providing a novel form of fixture for supporting the frame or casting in such a manner that it may be lowered and the piece to be welded secured thereto and be elevated and rotated, or tilted about either of its ends at any desired angle, by power so that the piece may be picked up from a truck or the ground and all sides of the frame or casting may be welded in the direction of gravity without removing the piece from the fixture.

Other objects of my invention will appear from time to time as the following specification proceeds.

My invention may be more clearly understood with reference to the accompanying drawings wherein.

Like reference characters refer to like parts throughout the several figures.

Figure 1:
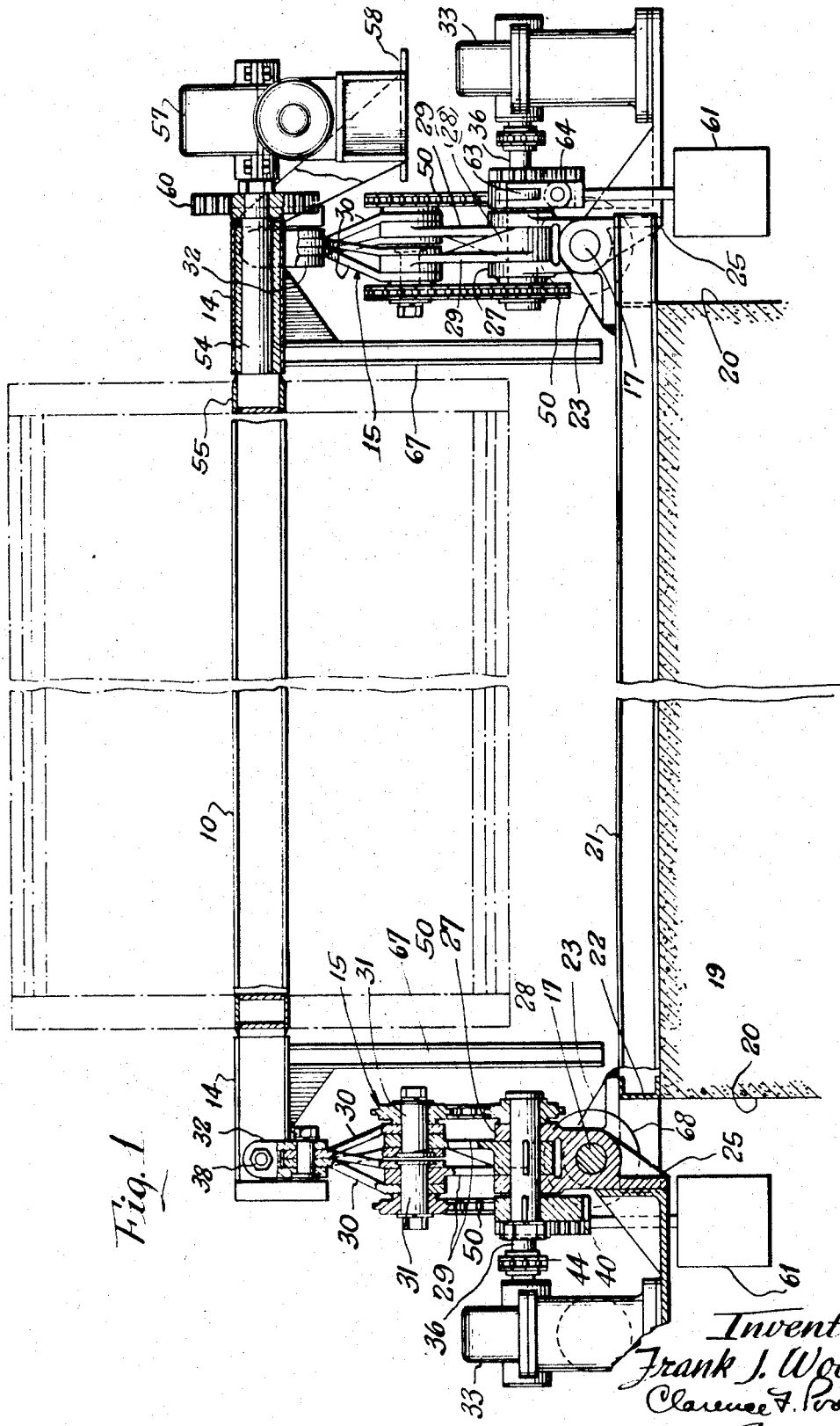
Figure 1 is a view in side elevation of a welding fixture constructed in accordance with my invention, with certain parts broken away and certain other parts shown in substantially longitudinal section.
Figure 2:
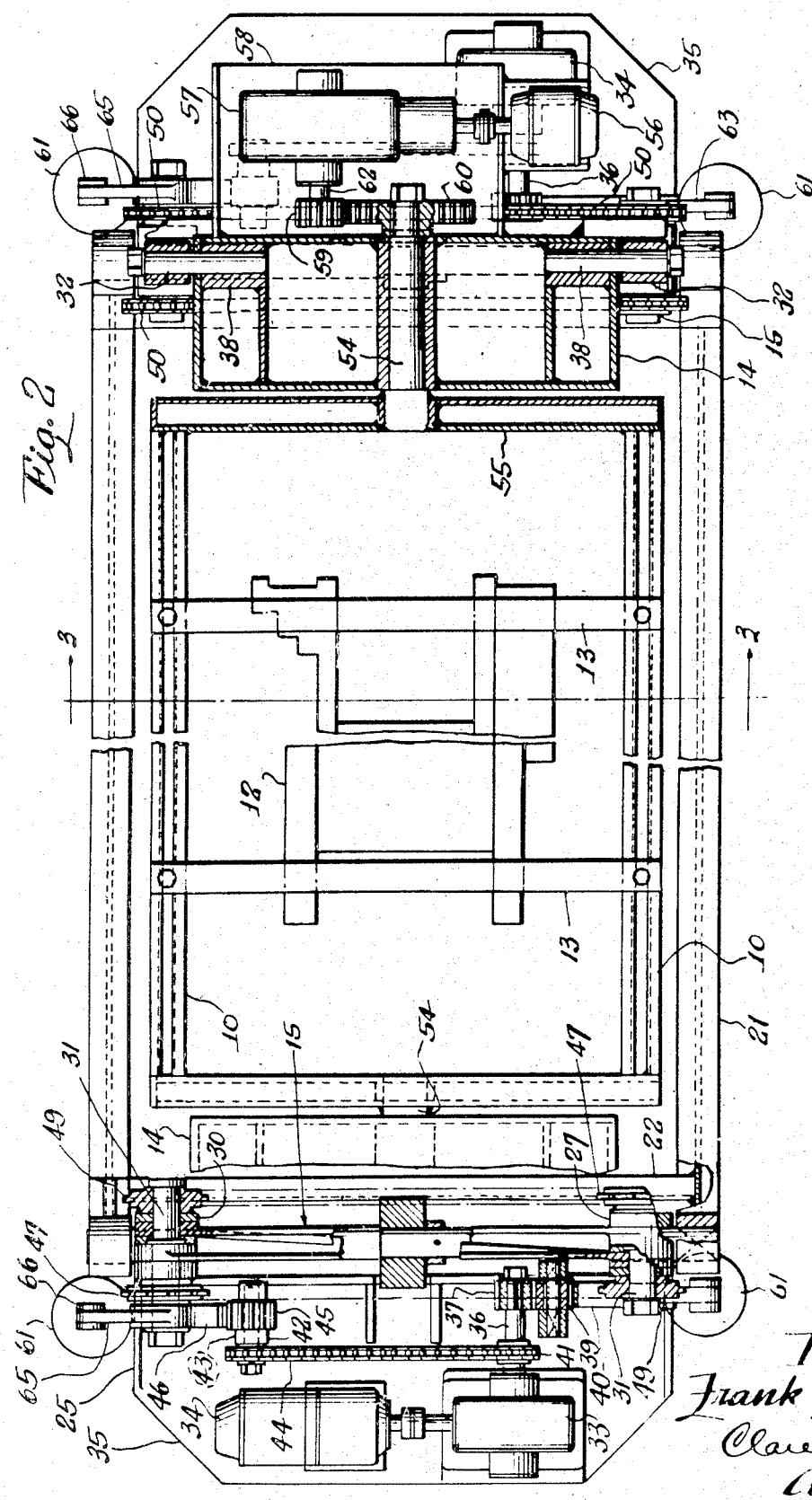
Figure 2 is a plan view of the fixture shown in Figure 1 with certain parts broken away and certain other parts shown in horizontal section.
Figure 3:
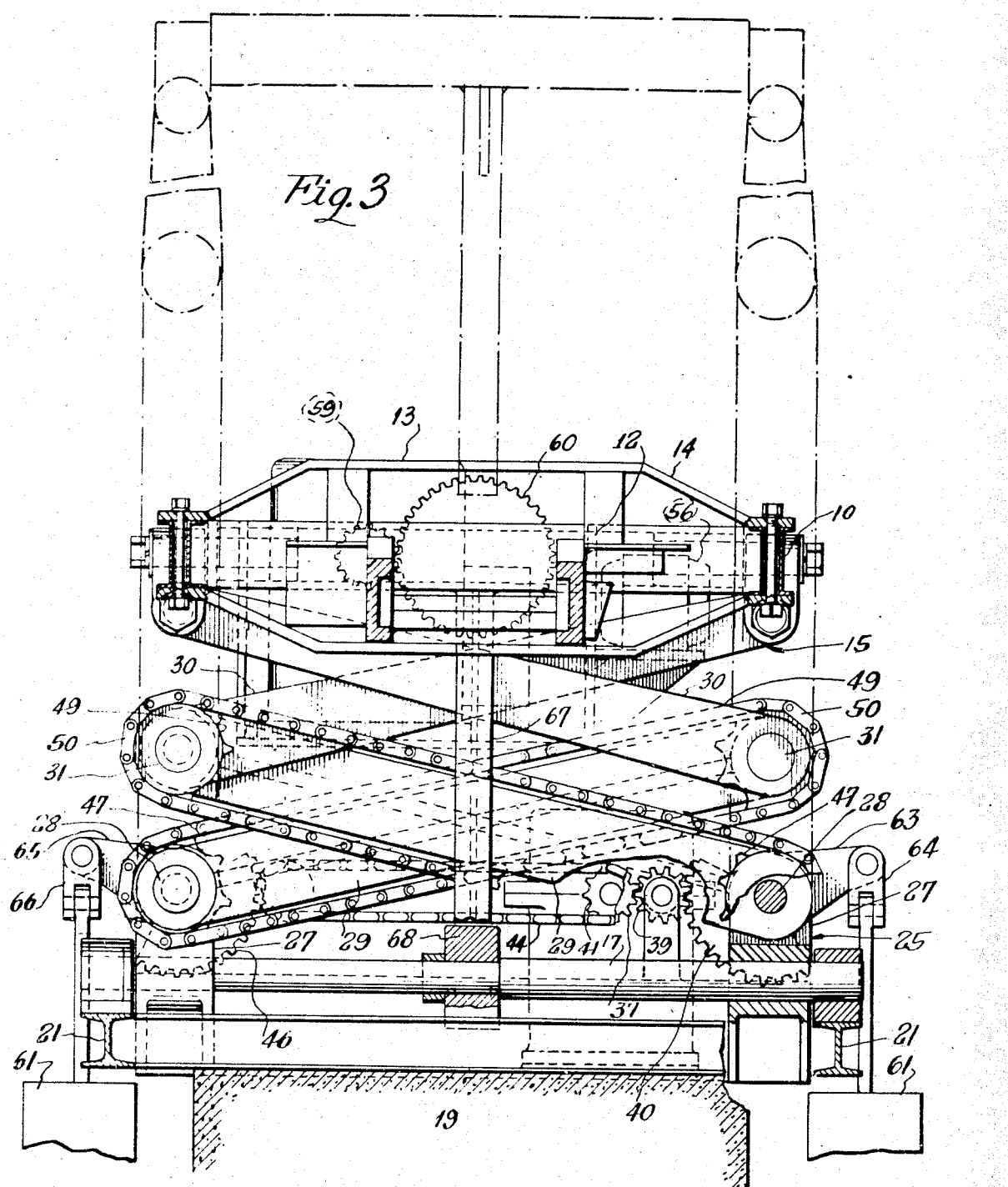
Figure 3 is a sectional view taken substantially along line 3—3 of Figure 2, drawn to a slightly enlarged scale.
Figure 4:
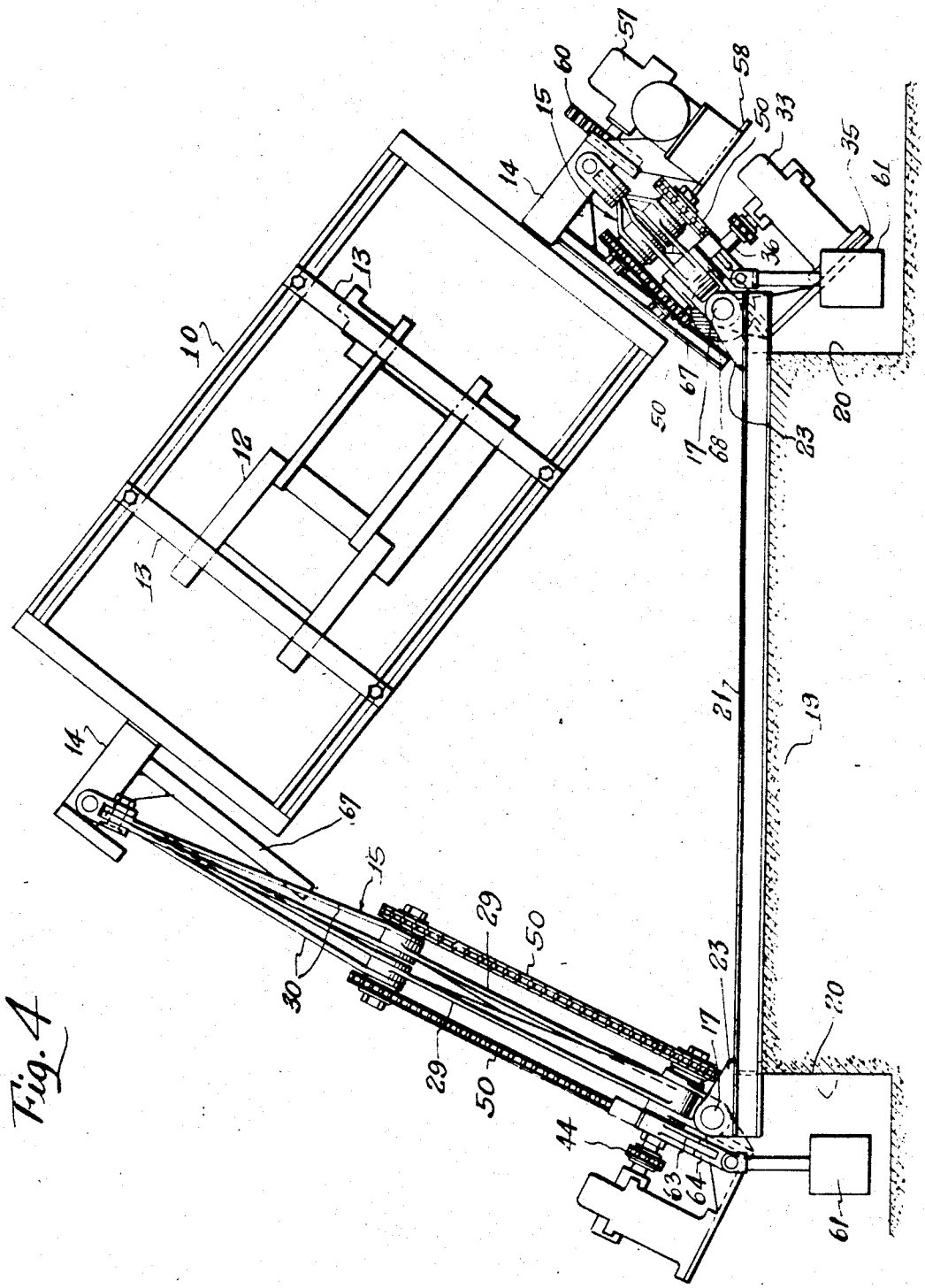
Figure 4 is a view in side elevation, showing the apparatus in a tilted position about one of its ends.

In the drawings, the embodiment of my invention illustrated includes generally a fixture 10, which, as herein shown, is in the form of an open rectangular frame, and is adapted to form a support for a casting or frame for welding. Said casting or frame is generally indicated by reference character 12 and is shown in Figures 2, 3 and 4, and may be of any desired type, of a size which will fit within the boundaries of said fixture. Said casting or frame is usually mounted within said fixture by a pair of cross supporting members generally indicated by reference characters 13, 13. Said cross supporting members are bridged across the open portion of said frame and are secured thereto in a suitable manner. Said casting or frame and cross supporting members are not herein shown or described in detail since they form no part of my present invention.

The fixture 10 is pivotally mounted at its ends on a pair of oppositely disposed support members 14, 14, for pivotal movement about a longitudinal axis, and said support members are in turn pivotally mounted for movement about transverse axes, on extensible supporting legs 15, 15. Said supporting legs are independently extensible for elevating or lowering said fixture about either of its ends and are pivotally mounted adjacent their lower ends on transverse shafts 17, 17 supported on opposite ends of a base frame 18 on upright bearing brackets 23, 23. Said base frame is mounted on a suitable foundation generally indicated by reference character 19, which may be of any suitable construction, to permit a truck to pass thereover under the fixture so the fixture may be lowered over the piece of material to be welded, and the piece of material may be secured to the fixture. The ends of said foundation are recessed below the floor to permit certain parts of the apparatus to extend below the top thereof.

Referring now in particular to the details of the apparatus, the base frame 18 is herein shown as being a rectangular frame formed from a pair of parallel spaced, longitudinally extending I-beams 21, 21, which are connected together adjacent their ends by channels 22, 22, and forms a support for the extensible supporting legs 15, 15, at its opposite ends. A runway may be provided to enable a truck to run over said I-beams beneath the fixture, or said I-beams may be recessed below the floor and the space between them filled with concrete.

The extensible supporting legs 15, 15 are each of a similar construction so one only need herein be described in detail. Each of said legs includes a pivotal base 25 extending across an end of the base frame 18 and extending beyond the end of said base frame. Said base is journaled on the transverse shaft 17, and is provided with a pair of oppositely disposed upright bearing brackets 27, 27 which form a pivotal support for a pair of longitudinal shafts 28, 28, upon which are mounted a pair of links 29, 29, for movement therewith. The opposite ends of said links each have a link 30 pivotally mounted thereon on a shaft 31. The upper ends of the links 30, 30 are pivotally connected between the furcations of forked connecting members 32, 32, depending from opposite ends of the support member 14. Said connecting members are pivotally connected to opposite ends of said support member on transversely extending pivotal pins 38, 38 (see Figure 2).

The links 29, 29 and 30, 30 are extended or retracted to raise or lower the support member 14 by power, by means of a speed reducer 33 directly connected to and driven from a motor 34 (see Figure 2). Said speed reducer and motor are mounted on an outward projection 35 of the pivotal base 25, and said speed reducer is of the self-locking worm and worm gear type; that is, the pitch of the worm is such that it cannot be rotated by the worm gear, and the details thereof are not herein shown or described since they are of a usual construction and form no part of my present invention. The purpose of this arrangement is to hold the legs 15, 15 in various desired positions of adjustment. It is, of course, obvious that a brake on the motor shaft or any other type of holding means may be provided to accomplish this same purpose, if desired. A shaft 36 extends inwardly from said speed reducer and has a pinion 37 mounted on its outer end, which meshes with and drives an idler gear 39. Said idler gear in turn meshes with a gear 40, which is herein shown as being a gear sector keyed to the longitudinal shaft 28, for pivoting said shaft and the link 29. A sprocket 41 is likewise mounted on the shaft 36 and is driven therefrom. Said sprocket has driving connection with a shaft 43, journaled in a bearing bracket 42, by means of a chain and sprocket drive generally indicated by reference character 44. A pinion 45 is mounted on and driven from said shaft and meshes with and drives a gear sector 46 on the outer end of the shaft 28, opposite from the shaft to which the gear sector 40 is keyed.

The links 30, 30 are pivotally moved simultaneously with and in the direction of movement of the links 29, 29 by means of sprockets 47, 47 freely mounted on each shaft 28 and secured to the brackets 27, 27 in a suitable manner; such as, welding. The sprocket 47 on one shaft 28 is on the outer side of the link 29 while the sprocket 47 on the opposite shaft 28 is on the inner side of its associated link. A sprocket 49 is mounted on the shaft 31 and, as herein shown, is secured to the link 30 in a suitable manner; such as, welding, for pivoting said link upon pivotal movement of said sprocket. Endless chains 50, 50 are provided to connect the sprockets 47, 47 with the sprockets 49, 49. One chain 50 is thus on the outside of the links 29 and 30, while the opposite chain 50 is on the inside of said links, to prevent interference between opposite chains. Since the sprockets 47, 47 are secured to the brackets 27, 27 and are thus held from rotation, pivotal movement of the links 29, 29 in one direction or another will cause a like pivotal movement of the sprockets 49, 49 and links 30, 30, effected by pivotal movement of the links 29, 29 and the endless chains 50, 50 meshing with said respective sprockets. Thus, the links 29, 29 and 30, 30 may be extended from the retracted position shown in Figure 3 to the fully extended position, shown by broken lines in this figure, by power derived from the motor 34, and may be held in the various desired positions of adjustment by the self-locking worm and worm gears of the speed reducer 33.

A pair of counterweights 61, 61 is provided to aid the motor 34 to extend the links 29, 29 and 30, 30. One of said counterweights depends from and is pivotally connected to an arm 63, projecting outwardly from the gear sector 40 in a direction away from the teeth of said gear sector, by means of a connecting link 64 pivotally connected to the outer end of said arm and having said counterweight pivotally connected thereto. The opposite counterweight is pivotally connected to an arm 65, extending outwardly from the opposite gear sector 46, by means of a connecting link 66. Said counterweights, as herein shown, extend below the ends of the foundation 19 and act in the direction of turning movement of the gear sectors 40 and 46, when being driven in a direction to extend the links 29, 29 and 30, 30.

Each support frame 14 is provided with a stabilizing member 67 depending from the central portion thereof and adapted to engage a roller 68 on the transverse shaft 17 when the associated support member is in a lowermost tilted position, to more rigidly support the apparatus when in such a position.

The fixture 10 is pivotally mounted on the support frames 14, 14 by means of oppositely disposed longitudinally extending shafts 54, 54, one of which shafts is journaled in the central portion of each support frame. The inner ends of each of said shafts are secured to an end frame member 55 of the fixture 10 in a suitable manner; such as, welding. The shaft 54 mounted in the support member, which is shown as being on the right hand side of the drawings in Figures 2 and 3, is rotatably driven by a motor 56 which drives a speed reducer 57. Said motor and speed reducer are mounted on a support bracket 58 projecting outwardly from the support frame in which the shaft 54 is mounted.

The speed reducer 57 is a worm and worm gear type of speed reducer of the self-locking type, similar to the speed reducers 33, 33, so arranged as to hold the fixture 10 in the various desired positions of adjustment without the use of additional locking means, and is of an ordinary construction well known to those skilled in the art so will not herein be shown or described in detail. A spur pinion 59 is keyed on the outer end of a shaft 62, projecting from and driven by said speed reducer, and meshes with and drives a spur gear 60 keyed on the outer end of the shaft 54.

It may be seen from the foregoing that a welding fixture and support therefor has been provided which includes an open frame, so arranged that said frame may be lowered over the piece which it is desired to weld, so the piece may be secured thereto within the boundaries thereof. It may also be seen that the frame and piece to be welded may be tilted about either end by power and held in the desired position of adjustment by the tilting mechanism, and may also be pivoted by power about a longitudinal axis to permit welding of any side or the end of the frame in the direction of gravity, by rotating said frame, with the piece which is to be welded mounted therein, or by tilting said frame in one direction or another.

While I have herein shown and described one form in which my invention may be embodied, it will be understood that the construction thereof and the arrangement of the various parts may be altered without departing from the spirit and scope thereof. Furthermore, I do not wish to to be construed as limiting myself to the specific embodiment illustrated, excepting as it may be limited in the appended claims.

I claim as my invention:

1. In a welding fixture, a base, a frame adapted to support a piece of material for welding, means supporting said frame on said base for rotation about a longitudinal axis and for tilting movement about spaced apart parallel transverse axes to permit welding of the top, bottom or sides of the piece of material in the direction of gravity including a pair of support members pivotally supporting opposite ends of said frame, spaced apart independently extensible means pivotally connected between said base and support members for movement about parallel spaced transverse axes, and power operated means for extending or retracting said extensible means, for elevating or lowering said support members independently or simultaneously with respect to each other.

2. In a welding fixture, a frame adapted to support a piece of material for welding, means supporting said frame for rotation about a longitudinal axis to permit welding of the top, bottom or sides of the piece of material in the direction of gravity without removing the piece from the fixture including a pair of support members forming a pivotal support for opposite ends of said frame, and a pair of independently extensible legs supporting said support members and adapted to elevate or lower said support members independently or simultaneously with respect to each other, said extensible legs each including a base member pivoted for movement about an axis transverse to the longitudinal axis of said frame, another member having pivotal supporting connection with said support member, and a plurality of extensible parallel links interposed between said members.

3. In a welding fixture, a frame adapted to support a piece of material for welding, means supporting said frame for rotation about a longitudinal axis to permit welding of the top, bottom or sides of the piece of material in the direction of gravity without removing the piece from the fixture including a pair of support members forming a pivotal support for opposite ends of said frame, and a pair of independently extensible legs forming a support for said support members and adapted to elevate or lower said support members independently or simultaneously with respect to each other, said extensible legs each including a base member pivoted for movement about an axis transverse to the longitudinal axis of said frame, another member having transverse pivotal supporting connection with said support member, a plurality of parallel links interposed between said base member and other member, and power operated means mounted on said base member for pivotally moving said links in an extending or retracting direction.

4. In a welding fixture, a frame adapted to support a piece of material for welding, means supporting said fixture frame for rotation about a longitudinal axis and for tilting movement about either of its ends, to permit welding of the top, bottom or sides of the piece of material in the direction of gravity without removing the piece from the fixture including a pair of support members forming a pivotal support for opposite ends of said frame, and a pair of independently extensible legs forming a support for said support members and adapted to elevate or lower said support members independently or simultaneously with respect to each other, each of said extensible legs including a base member pivoted for movement about an axis transverse to the longitudinal axis of said frame, a plurality of parallel links pivotally connected between said base and respective support member, power operated means mounted on said base member for pivotally moving said parallel links in an extending or retracting direction including a pair of oppositely disposed gears driven by said motor, and a counterweight connected to each of said gears so that the weight thereof will act in a direction to tend to pivot said gears and links in an extending direction.

5. In a welding fixture, an open fixture frame adapted to support a piece of material for welding, a base, and a supporting connection between said base and fixture frame for supporting said frame above said base for rotational movement and for tilting movement about either of its ends to permit welding in the direction of gravity of the top, bottom or any angular surface of the piece of material without removing said piece from the frame including a pair of extensible legs transversely pivoted on said base adjacent their lower ends and a support member transversely pivotally mounted on each of said legs adjacent their upper ends and having said fixture frame pivotally mounted therebetween.

6. In a welding fixture, an open fixture frame adapted to support a piece of material for welding, a base, and a supporting connection between said base and frame for supporting said frame above said base for rotational movement and for tilting movement about either of its ends to permit welding in the direction of gravity of the top, bottom or any angular surface of the piece of material without removing said piece from the frame including a pair of extensible legs pivotally mounted on opposite ends of said base at their lower ends for movement about transverse axes, a support member pivotally mounted on the upper end of each of said legs, a pivotal supporting connection between said support members and said fixture frame, and each of said legs including, as a part thereof, mechanism adapted to extend or retract said legs.

7. In a welding fixture, an open fixture frame adapted to support a piece of material for welding, a base, and a supporting connection between said base and frame for supporting said frame above said base for rotational movement and for tilting movement about either of its ends to permit welding in the direction of gravity of the top, bottom or any angular surface of a piece of material supported thereby, without removing said piece from the frame including a pair of extensible legs pivotally mounted to opposite sides of said base at their lower ends for movement about parallel spaced transverse axes, a support member pivotally mounted on the upper end of each of said legs for movement about a horizontal transverse axis, a supporting connection between said support members and said frame, for supporting said frame for pivotal movement about a longitudinal axis, power driven means for rotatably moving said frame and other power driven means for independently extending or retracting either of said legs.

8. In a welding fixture, an open fixture frame adapted to support a piece of material for welding, a base, and a supporting connection between said base and frame for supporting said frame above said base for rotational movement and for tilting movement about either of its ends to permit welding in the direction of gravity of the top, bottom or any angular surface of the piece of material without removing said piece from the frame, and for vertical movement to permit lowering of said frame so said piece of material may be secured thereto without lifting including a pair of extensible legs pivotally mounted to opposite sides of said base at their lower ends for movement about parallel spaced transverse axes, each of said legs including a plurality of extensible parallel links, a support member pivotally mounted on the upper end of each of said legs for movement about a horizontal transverse axis, a supporting connection between said support members and opposite ends of said frame for supporting said frame for pivotal movement about a longitudinal axis, power driven means for rotatably moving said frame, other power driven means for independently extending either of said legs including a pair of power driven gears having operative connection with opposite sides of each of said legs, and a counterweight having connection with each of said gears and arranged to act in a direction to tend to extend said associated links.

FRANK J. WOOD.